United States Patent [19]
Batson

[11] 3,767,948
[45] Oct. 23, 1973

[54] CONCENTRIC ASSEMBLY FOR PORTABLE ELECTRIC ROUTER

[75] Inventor: William A. Batson, Pickens, S.C.

[73] Assignee: The Singer Company, New York, N.Y.

[22] Filed: Nov. 13, 1972

[21] Appl. No.: 306,089

[52] U.S. Cl............. 310/50, 144/136 C, 144/134 D
[51] Int. Cl............................ B27c 5/10, B23b 5/22
[58] Field of Search .................. 310/50, 29, 89, 91; 90/12 D; 144/134 D, 136 C

[56] References Cited
UNITED STATES PATENTS
2,842,173   7/1958   Turner et al.................... 144/134 D
3,466,973   9/1969   Rees ............................... 144/134 D
3,489,191   1/1970   Blevins........................... 144/134 D

*Primary Examiner*—J. D. Miller
*Assistant Examiner*—Robert J. Hickey
*Attorney*—Marshall J. Breen et al.

[57] ABSTRACT

A concentric assembly for a portable electric router having a base formed with a cylindrical sleeve terminating in a bottom flange for work engaging. A cylindrical motor housing is axially adjustably disposed within the sleeve. A motor is mounted within the motor housing and has an armature shaft centrally journaled therein. An arcuate pad is formed internally on one side of the sleeve with the arc of its surface set off from a radius substantially equal to the radius measured from the axis of the armature shaft to the outer periphery of the motor housing. A clamping means is connected through the sleeve on the side opposite the pad to force the motor housing against the pad to lock the same in adjusted axial position and to place the motor housing in concentric position. When the clamp is loosened, a rack and pinion mechanism connected between the motor housing and the sleeve can be used to axially position the motor housing to adjust the depth of cut of the router.

5 Claims, 10 Drawing Figures

PATENTED OCT 23 1973 3,767,948

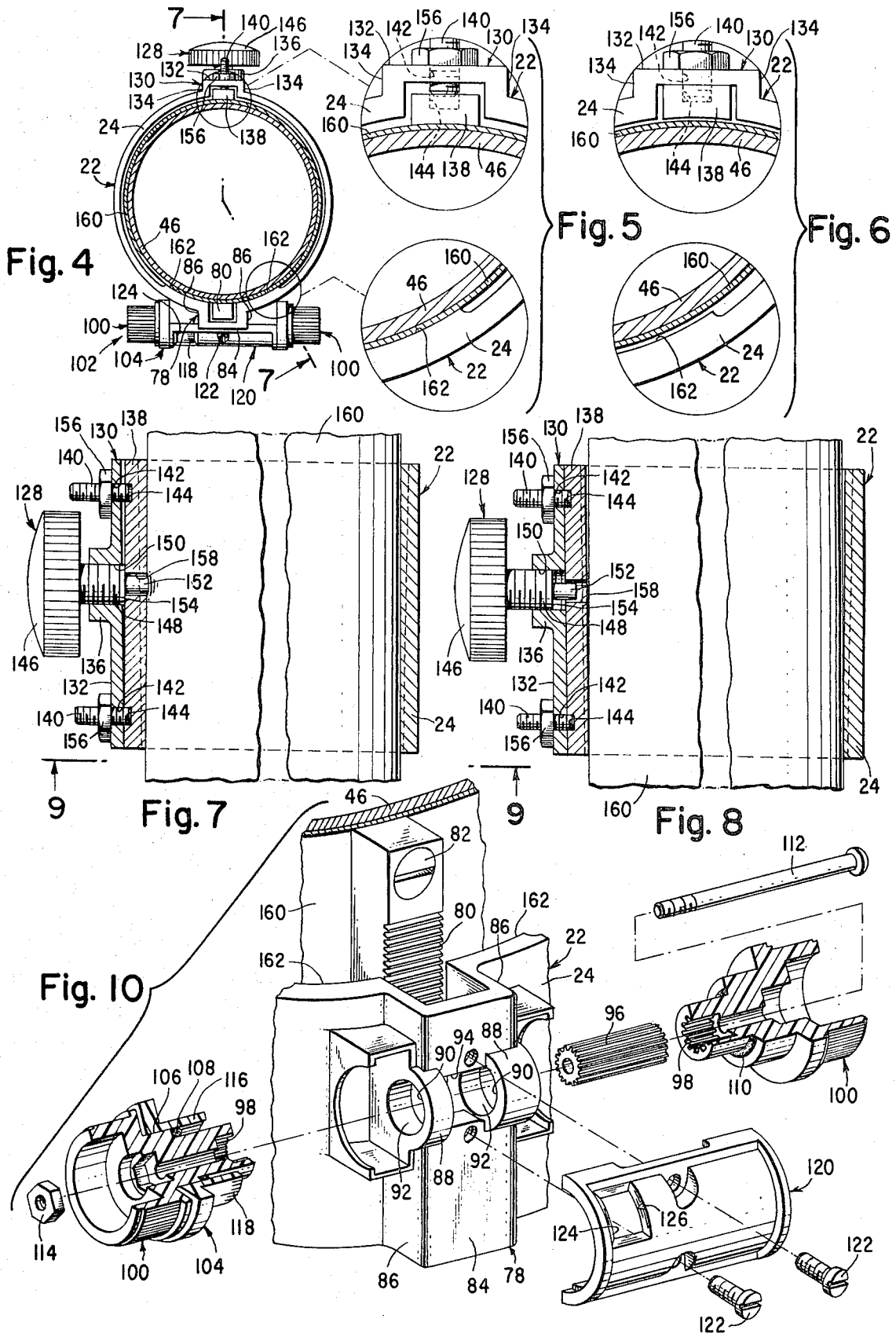

3,767,948

CONCENTRIC ASSEMBLY FOR PORTABLE ELECTRIC ROUTER

BACKGROUND OF THE INVENTION

Heretofore, it has been common practice in the prior art to construct routers so that the motor housing was axially adjustable within a base. The base was provided with a sleeve to receive the motor housing and interconnected depth of cut adjustment means were provided. Sometimes, but not always, a clamp was also used to lock the motor housing in adjusted position within the sleeves. Some of the adjustment means took the form of turnable threaded members, or the rack and pinion type and the sleeve could be solid or split to provide for the clamping feature. In any event, the various prior art constructions had one or more deficiencies such as being complex, costly to manufacture, difficult to adjust and maintain accuracy, the adjustment took too much time, and the lack of positive concentricity between the motor housing and the base.

SUMMARY OF THE INVENTION

It is an object of the present invention to provide an improved concentric assembly for a portable electric router which overcomes the prior art disadvantages; which is simple, economical, accurate and reliable; which is axially adjustable and provides positive concentricity between the motor housing and the base; which uses an arcuate pad on the sleeve of the base against which a clamp forces the motor housing to assure concentric position thereof; which uses a pair of pads and a pressure bar with the clamp to provide a three point concentric adjustment; and which uses a clamping screw having a pin forming an interference fit directly with the motor housing.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 4 is a sectional view taken along line 4—4 of FIG. 1.

FIG. 5 is a greatly enlarged view of encircled parts of FIG. 4 at the clamp and pad, respectively, showing an axially locked position.

FIG. 6 is a view similar to FIG. 5, wherein the clamp and pad, respectively, are in unlocked position.

FIG. 7 is a view taken along line 7—7 of FIG. 4 showing the clamping means in locked position.

FIG. 8 is a view similar to FIG. 7 showing the clamping means in unlocked position.

FIG. 10 is an exploded perspective view of the depth of cut adjusting mechanism for the router.

DESCRIPTION OF THE INVENTION

Figure 1:
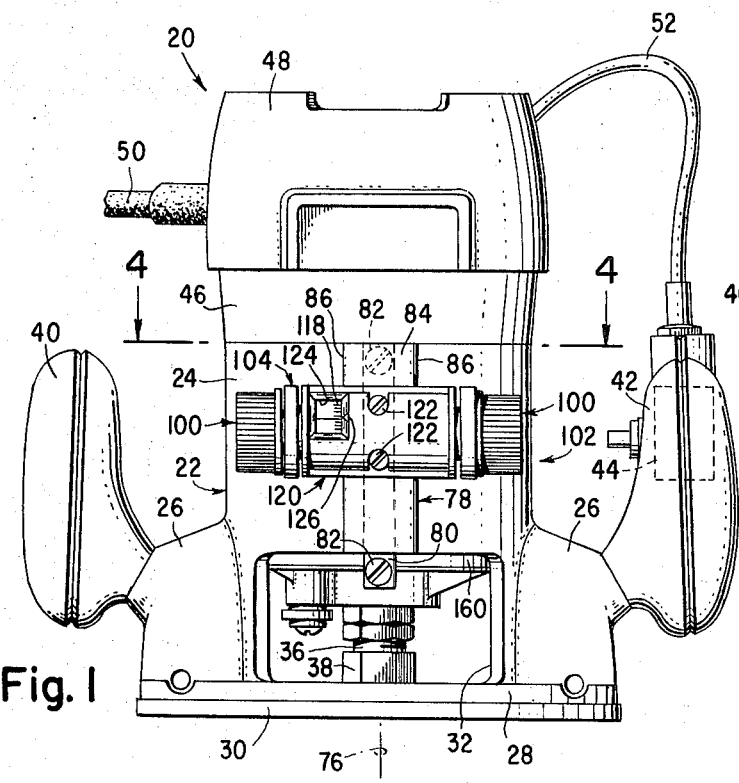
FIG. 1 is a front elevational view of a portable electric router embodying the present invention.
Figure 3:
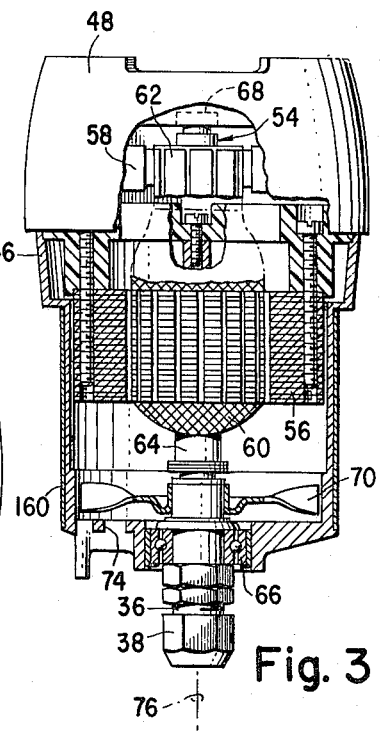
FIG. 3 is a front elevational view, partly in section, of the motor housing of the router.

A router, designated generally as 20, is illustrated in FIGS. 1 and 3 as having a stationary base 22, the upper portion of which is in the form of a cylindrical sleeve 24. The sleeve 24 has two downwardly extending diametrically opposed leg portions 26 which terminate in a flat flanged portion 28 that is adapted to contact the work itself, or to receive a nonmetallic subbase 30 suitable for sliding over the work. A large aperture 32 is provided between the legs 26 and flange 28 through which to observe the cutting of the work by a suitable tool bit (not shown) secured in a collet 36 by a nut 38.

Secured to the base 22 on the outside of one leg 26 is a handle 40, and on the other leg 26 is a control handle 42. A trigger switch 44 is mounted in the control handle 42 to provide for natural two-hand guiding of the router 20 with the trigger switch always under the operator's finger and available for instant control.

A motor housing 26 as shown in FIGS. 1 and 3, is adapted to telescope within the base 22 for vertical sliding motion relative thereto. An insulated end cover 48 surmounts the motor housing 46 and is adapted to receive a power cord 50 and a switch cable 52 for electrical connection to the switch 44 housed within the control handle 42.

A series commutator electric motor 54 is connected in series with a power cable 50 and the switch cable 52, and is mounted within the motor housing 46. The motor 54 has a stator core 56, brush and brush holders 58 arranged in conventional fashion. A rotor 60 with a commutator 62 is mounted on an armature shaft 64 journaled in bearings 66 and 68. A fan 70 carried by the shaft 64 provides ventilation for the motor by drawing air in through apertures 72 shown in FIG. 2 formed in the end cover 48 and exhausting it through apertures 74 shown in FIG. 3 in the lower end of the motor housing 46 where it is instrumental in blowing chips away from the bit.

Actuation of the trigger switch 44 results in operation of the motor to turn the armature shaft 64 about the axis 76. In order to obtain precise cutting of a consistent quality, it is important that the axis 76 of the motor housing not be shifted in position once the motor housing 46 is mounted or adjusted within the base 22 and one of the principle features of the present invention is to insure the concentricity of the motor housing 46 within the base 22 by clamping the same against the sleeve 24 in a manner set forth more fully hereinafter.

Figure 2:
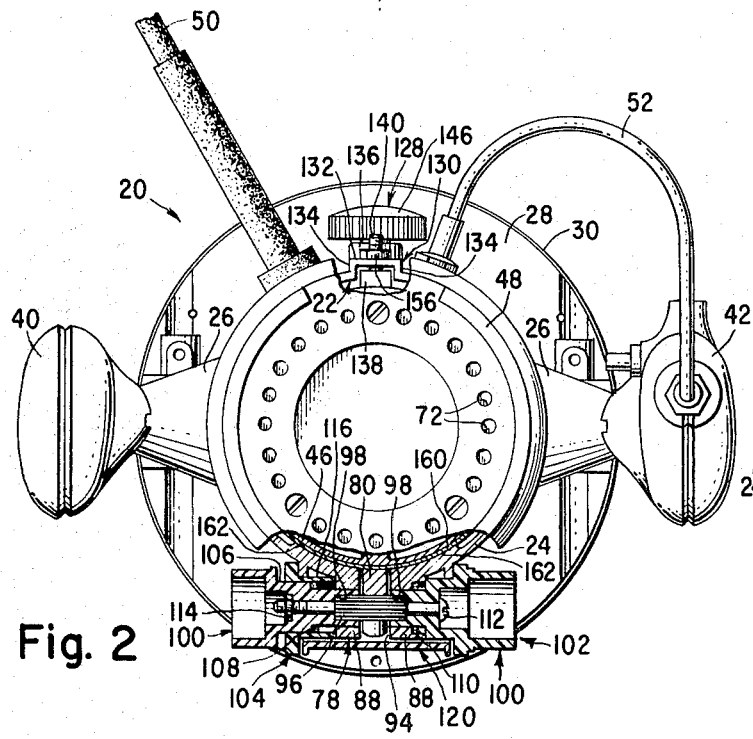
FIG. 2 is a top plan view of the router of FIG. 1 with parts cut away to show sectional view of the structure of the present invention.
Figure 9:
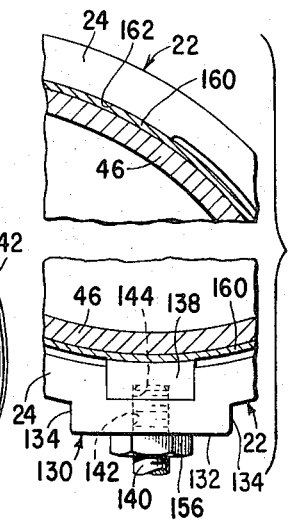
FIG. 9 is a view taken along line 9—9 of FIG. 7.

In working with a router 20, it is often desirable to adjust the depth of cut, and one way that this may be accomplished is to adjust the motor housing 46 relative to the base 22. As shown in FIGS. 1, 2 and 10, the sleeve 24 of the base 22 is formed with a radially offset portion 78 adapted to provide a slidable housing for a rack member 80 which is secured to the motor housing 46 by means of tap screws 82. The rack-receiving portion 78 is an open ended box-like structure having a front wall 84 and side walls 86. Thickened portions 88 of the side walls 86 provide lugs spaced in fixed relation on opposite sides of the rack member 80. Aligned bores 90 extend through the lugs 88 and provide spaced bearing seats 92 therein. Intermediate the lugs 88 an opening 94 is formed to provide access to the rack member 80 for driving engagement therewith by a pinion 96, the ends of which are spline-connected as at 98 within a pair of end knobs 100, each journaled within a bearing seat 92.

The pinion assembly, designated generally 102, also includes a zero-set knob 104 that rotatively sits upon the hub 106 of the left knob 100 as viewed in FIGS. 2 and 10, and a resilient O ring 108 which frictionally holds the zero-set knob in adjusted position, a resilient O ring 110 mounted on the right hand end knob 100 to frictionally hold the interconnected knobs 100 in adjusted position, and a screw 112 which passes through to join the components of the assembly and threadedly receives a nut 114 to complete the assembly.

The zero-set knob 104 is flanged and nests above the left hand knob 100 to be frictionally coupled thereto by the O ring 108 held captive and in compression between the two parts. The splines at 98 of the end knobs 100 lock the pinion 96 for rotation with the end knobs 100 responsive to suitable turning of the end knobs by the operator. The nut 114 is held non-turnably within the left hand end knob 100 and will be connected to the screw 112 which is passed through the nested assembly of parts wherein the pinion 96 acts as a spacer to hold the knobs 100 in clamped relation with respect to the lugs 88. The zero set knob has a sleeve portion 116 which carries circumferentially spaced graduation marks 118 on its surface. A semicylindrical cover plate 120 is secured to the front wall 84 by means of screws 122 and covers the pinion assembly 102, permitting only the knurled portions of each of the knobs 100 and 104 to be exposed at either end thereof for manipulation. A window 124 formed in the cover plate 120 is provided with a fixed reference mark 126 to enable the graduation marks 118 to be viewed so that the zero-set knob 104 may be selectively rotated to any desired initial annular indexed setting with respect to the angular position of the pinion shaft 96. Though one hand could be used to make the depth of cut adjustment, it will be more convenient for the operator to grasp each of the end knobs 100 to effect the depth of cut adjustment.

A clamping assembly designated generally 128 is illustrated in FIGS. 2, 4, 7 and 8. The clamping assembly 128 will be loosened prior to adjusting or changing the depth of cut and thereafter will be tightened to lock the router 20 in the adjusted position. The clamping assembly 128 is mounted within a radially offset portion 130 formed in the sleeve 24 diametrically opposite the radial offset portion 78. The radially offset portion 130 has a front wall 132 and side walls 134. A boss 136 is formed on the front wall 132 slightly above the midpoint thereof. The clamping assembly 128 includes a pressure bar 138 vertically disposed within the radially offset portion 130, a pair of positioning screws 140 disposed in tapped holes 142 to extend into recesses 144 formed in the pressure bar and spaced in alignment with the tapped holes 142, and a clamping knob 146 having a threaded portion 148 received within a tapped hole 150 of the boss 136. A clamping knob 146 has a end portion 152 of reduced diameter having a length a few thousandths of an inch longer than the width of the pressure bar 138. An annular shoulder 154 is formed between the threaded portion 148 and the end portion 152. The positioning screws 140 extend through the tapped holes 142 for a predetermined length to be fixed by the nut 156 which is tightened against the front wall 132. The end portion 152 extends through an aperture 158 formed in the pressure bar 138. The lower half of the motor housing 46 is fitted with a cylindrical sleeve 160 made from low friction sheet steel.

In unclamped position the motor housing 46 is free to be adjusted to a suitable depth of cut by the pinion assembly 102. With the clamping assembly 128 in unclamped position, the pressure bar will rest against the inner face of the front wall 132 as shown in FIG. 8, and the clamping knob 146 will be sufficiently unscrewed so that the annular shoulder 154 does not engage the pressure bar 138.

A pair of pads 162 are formed on either side of the radially offset portion 78 internally of the sleeve 24 to extend the full axial length of the sleeve 24. The inner surface of the pads 162 is arcuately shaped and may be formed by milling from a common center point at a radius substantially equal to the radius measured from the axis 76 of the armature shaft 64 to the outer periphery of the sleeve 160 of the motor housing 46. In this way, in clamped position, the center point of the pads 162 and the axis 76 of the motor housing 46 will be coincident. Once the depth of cut adjustment has been made, the motor housing 46 may be clamped in position by merely turning the clamping knob 146 to tighten the shoulder 154 thereof against the pressure bar 38 to force the same into full line axial contact with the sleeve 160 of the motor housing 46, as is illustrated in FIG. 7. As the clamping knob 146 is tightened, the end portion 152 will extend a few thousandths of an inch beyond the pressure bar 138 to form an interference fit upon the sleeve 160, thus assuring the clamping action of the clamping assembly 128. Operation of the clamping assembly 28 causes the sleeve 160 of the motor housing 46 to be positively seated upon the pads 162, thus aligning the axis 76 of the motor housing 46 with the center point of the pads 162 each time the clamping assembly 128 is applied. Regardless of how many times the depth of cut adjustment is made, upon re-clamping the motor housing 46 in position, the axis 76 always is positioned coincident to the center point of the pads 162.

The pads 162 serve as two points, while the pressure bar serves as the third point of a three point support system which insures the positive positioning of the axis 76 coincident to the radial center point of said pads 162. FIGS. 4, 5, 7 and 9 each show views of the sleeve 160 contacting the pads 162 and maintained in position by the clamping assembly 128 wherein the pressure bar 138 and clamping knob 146 have forced the sleeve 160 of the motor housing 64 against said pads 162.

Whenever it is desired to change or adjust the depth of cut, the clamping assembly 128 will be loosened as is illustrated in FIGS. 6 and 8, wherein the pinion assembly 102 may be operated with respect to the rack member 80 to adjust the depth of cut. Thereafter, the motor housing 46 may be re-clamped in adjusted position.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed herein is:

1. A portable electric router for driving a bit comprising:
 a. a base having a cylindrical sleeve terminating in a bottom flange for work engaging,
 b. a cylindrical motor housing axially adjustably disposed within the sleeve, c. a motor having an armature shaft centrally journaled within the motor housing with one end of the shaft extending therefrom to carry the bit, d. a pad formed on one side internally of the sleeve and having a curved surface, the arc of which is set off from a radius substantially equal to the radius measured from the axis of the armature shaft to the outer periphery of the motor housing, and e. a clamping means adjustably extending through the sleeve on the side opposite the pad to force the motor housing against the pad to lock the motor housing in adjusted axial position and to place the motor housing in concentric position.

2. The combination claimed in claim 1 wherein:

a. the sleeve includes a pair of diametrically opposite recesses extending radially outwardly therefrom, b. the arcuate pad formed in a pair of pad sections on either side of one of the sleeve recesses, and c. the clamping means including a pressure bar disposed in the axial recess opposite the pads and a clamping screw threadedly extending through the sleeve to engage the bar whereby on turning of the clamping screw the bar will force the motor housing into contact with the pads to place the axis of the armature shaft concentric to the radial point of the pads.

3. The combination claimed in claim 2 wherein:

a. the pressure bar has a radial aperture adjacent to and smaller than the diameter of the clamping screw, b. a pin section of reduced diameter formed at the end of the clamping screw to extend through the radial aperture of the pressure bar, and c. the pin section longer than the width of the pressure bar by a few thousandths of an inch whereby upon the clamping screw being tightened against the pressure bar the pin section will extend by the few thousandths of an inch into direct contact with the motor housing to form an interference fit therewith.

4. The combination claimed in claim 3 wherein:

a. a pair of locator means connected through the sleeve to contact the pressure bar and permit radial movement thereof and prevent axial movement of the bar, and b. the locator means axially disposed on either side of the clamping screw.

5. The combination claimed in claim 4 wherein:

a. a rack is fixedly connected upon the motor housing in axial position to extend within the recess adjacent the pads, b. a pinion connected across the recess of the sleeve to engage the rack, and c. means connected to the pinion to rotate the same, whereby upon loosening of the clamping screw, the motor housing is axially raised or lowered into adjusted position prior to reclamping the screw.

* * * * *